United States Patent [19]

Koeberle

[11] Patent Number: 5,580,241
[45] Date of Patent: Dec. 3, 1996

[54] MULTISTAGE CIRCULATING FLUIDIZED BED

[75] Inventor: Paulo G. Koeberle, Kitchener, Canada

[73] Assignee: Biothermica International Inc., Montréal, Canada

[21] Appl. No.: 423,226

[22] Filed: Apr. 17, 1995

Related U.S. Application Data

[63] Continuation of Ser. No. 225,823, Mar. 30, 1994, abandoned.

[30] Foreign Application Priority Data

May 4, 1993 [CA] Canada ................................ 2095480
May 3, 1994 [WO] WIPO ..................... PCT/CA94/00252

[51] Int. Cl.$^6$ ........................................................ F27D 19/00
[52] U.S. Cl. ................................ 432/58; 432/95; 432/96; 432/97; 432/99; 432/100; 432/14

[58] Field of Search ................................. 432/58, 95, 96, 432/97, 99, 14, 100; 110/216, 245; 122/4 D

*Primary Examiner*—Henry A. Bennett
*Assistant Examiner*—Siddharth Ohri
*Attorney, Agent, or Firm*—Robic

[57] ABSTRACT

A circulating fluidized bed thermal reactor such as a boiler or gasifier, having the riser divided into a sequence of stages by a plurality of restrictions which create multiple beds dynamically suspended. Circulation occurs below transport velocity, solids distribution is substantially uniform, average bed density can be varied from near-zero to very high values, solids mobility is unrestricted, temperature is uniform. Gases follow multistage CSTR flow regime, specially suited for fuels which break down into volatiles upon heating, such as biomass, hazardous wastes and most fuels other than coal.

6 Claims, 3 Drawing Sheets

MULTISTAGE CIRCULATING FLUIDIZED BED

This application is a continuation of parent application Ser. No. 08/225,823, filed Mar. 30, 1994, now abandoned.

BACKGROUND OF THE INVENTION

This invention relates to fluidized bed combustors and gasifiers, more particularly to an improved circulating fluidized bed. A practical multistaging configuration is incorporated to a circulating fluidized bed. It expands its scope of fluidized bed applications from coal to other fuels which contrary to coal, break down into volatiles upon heating. The present invention regards incineration of hazardous waste in an environmentally acceptable manner and gasification of biomass/wastes producing a low tar gas at lower cost.

DESCRIPTION OF THE PRIOR ART

Fluidized beds, specially circulating fluidized beds are extensively used as thermal reactors such as combustors, boilers and gasifiers, being more recently being considered for hazardous waste elimination. As used herein, in the abstract and in the accompanying claims, "thermal reactor" denotes any reactor wherein combustion or gasification reactions take place such as boilers, gasifiers and incinerators. Fluidized beds owe their high heat and mass transfer rates to the mixing action and surface availability of the sum of all individual solid particles in a bed suspended by an up-flowing gas current. Mixing action and available surface in gas-solid fluidized systems increase with the number of suspended particles and particle distribution uniformity. In fluidized beds uniform particle distribution is hindered by the spontaneous onset of gas-solids segregation phenomena, which create coexisting zones of very high, and very low concentration of solid particles moving past one another with little interaction strongly reducing heat and mass transfer rate. In bubbling fluidized beds such forms of segregation manifest themselves as bubbles and slugs while in the fast circulating bed so called dilute cores, dense annulus and particle streamers are the main forms. Gas-solids segregation also manifests itself as high concentration of solids at the reactor bottom, typically the lower 20% of reactor volume while in the remainder upper 80% solids concentration drops to very low values for the circulating fluidized bed and to zero for the bubbling fluidized bed. The replacement of these large empty, or near empty spaces by a dense bed holds the potential for significant performance increase particularly when fuels other than coal are processed because most of them release large quantities of volatiles prior to oxidation and oxidation of volatiles occurs mainly in the upper reaches of the reactor in a very limited residence time, making such reactions mixing-limited. Multistaging offers the possibility of high mixing rates throughout the entire reactor by replacing the empty freeboard and near-empty risers with a number of additional fluidized beds, thus, rendering the freeboard significantly more productive. This solution is addressed by a number of patents such as U.S. Pat. No. 4,279,205, U.S. Pat. No. 4,476,816 and U.S. Pat. No. 4,681,065. These earlier attempts to impose staged conditions to fluidized beds have relied on technology borrowed from tray towers and resulted in complicated designs characterized by limited solids mobility, difficulty in maintaining uniform temperature and difficulty to discharge bottom ashes and tramp solids.

SUMMARY OF THE INVENTION

The present invention relates to a multistage turbulent circulating fluidized bed thermal reactor design which provides dynamic bed suspension and therefore obviates complicated and expensive bed holding structures found in earlier approaches. In the present invention multiple beds are hold in place inside fixed gas velocity gradient holes. Multiple beds form spontaneously when the system is turned on and they overcome all limitations imposed by conventional suspension structures, accordingly, solids mobility is unrestricted, temperature stays uniform throughout the system while ashes and tramp solids are easily discharged. The present invention is thus capable to harness the high performance brought about by multistaging while overcoming all disadvantages associated to conventional multistaging, mentioned above. The present invention comprises a riser, a gas-solids separator and a controlled downcomer operatively interconnected, said riser comprising a vertical elongated cylindrical or prismatic chamber, the difference being that said riser has a plurality of localized reductions of the internal horizontal cross-section, or restrictions, said restrictions are spaced throughout the riser, concentric with the axis of said riser and divide said riser into a sequence of stages interconnected by said restrictions. In accordance to the present invention the ratio between the restriction equivalent diameter and the riser internal equivalent diameter at the stage immediately below said restriction is such as to cause the gas velocity through said restriction to be above transport velocity while the superficial gas velocity through said stages remains below transport velocity, accordingly, said ratio ranges from 0.3 to 0.7, being preferably about 0.4 to 0.6. Furthermore the ratio of the distance between adjacent restrictions and internal diameter of the stage therebetween ranges from about 1 to about 5, said ratio not being necessarily equal throughout all stages of the riser. Still in accordance of the present invention the upper surface of each restriction has the shape of a funnel or cone frustum if the riser is cylindrical, or an inverted pyramid frustum if riser has a square section, said surface forming angles of approximately 20° to 60° with the reactor axis, said angle facing upwards. Still in accordance to present invention the lower surface of each said restriction may range from frusto-conical or frusto-pyramidal to flat forming any angle from 20° to 90° with reactor inside wall, said angle facing downwards. Still according to present invention both upper and lower surfaces of said restrictions should meet or come substantially close at the restriction inner reaches, ideally forming an edge, avoiding elongated passages in form of throat. According to present disclosure a riser meeting the above criteria is operationally connected with a gas-solid separator and a downcomer fitted with a control valve in an arrangement similar to the arrangement used in a conventional circulating fluidized bed. Contrary to conventional circulating fluidized beds which operate at gas velocity within transport range, the present invention operates with gas velocity inside all stages in the range below transport velocity and above minimum fluidization velocity. The disclosed riser offers the following advantages over conventional circulating fluidized bed riser:

a- Density of the bed of fluidizable solids is substantially uniform throughout the disclosed riser in contrast to highly non-uniform distribution of a conventional circulating fluidized bed riser.

b- When operated within prescribed parameters the bed exhibits stability, remaining in place even when circulation is interrupted in contrast to what happens in a conventional circulating fluidized bed riser where the bed is swept away under such circumstances.

c- The flow regime of the gases in the disclosed riser classifies as multistage "CSTR" in contrast to a conventional circulating fluidized bed riser where the flow regime of the gases is mostly "plug flow" type.

d- Macroscopic gas-solids segregation phenomena such as slugs, dilute core, dense annulus and solids streamers are strongly suppressed or eliminated in the disclosed riser.

e- The disclosed riser can operate at average bed densities as high as 10 times the values of a conventional circulating fluidized bed riser without the onset slugging.

f- The disclosed riser has no need for gas distribution grid at the bottom therefore offering the possibility of uncomplicated solids removal and start-up heating from below.

The changes in hydrodynamic behavior brought about in the disclosed invention allow to carry out oxidation reactions to a high degree of completion, allowing for incineration of hazardous wastes in an environmentally acceptable manner with virtually no residue of incomplete combustion and gasification with little or no tar in the producer gas, thus lowering gas cleaning requirements and overall gasification cost.

DETAILED DESCRIPTION OF THE PREFERRED EMBODIMENT

Figure 1A:
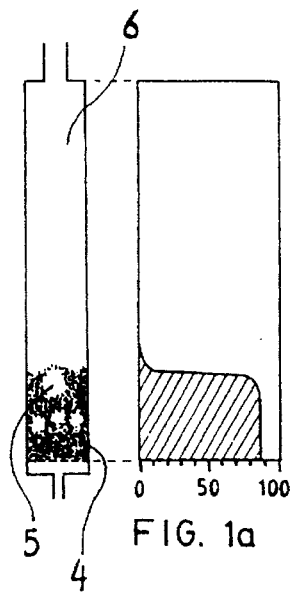
FIG. 1 shows the picture and graphic of the fluidized solids distribution of the following types of fluidized beds: a- typical bubbling fluidized bed, b- typical turbulent fluidized bed, c- typical circulating fluidized bed, d- the preferred embodiment.
Figure 1B:
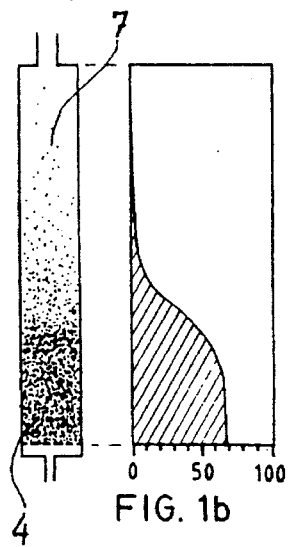
Figure 1C:
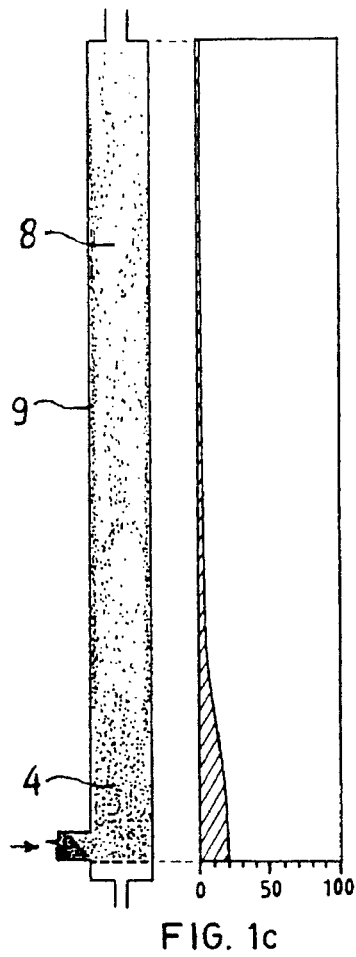
Figure 1D:
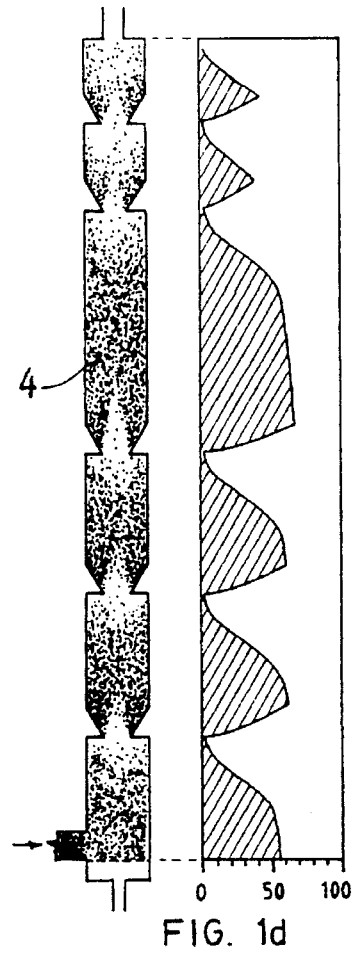
Figure 2A:
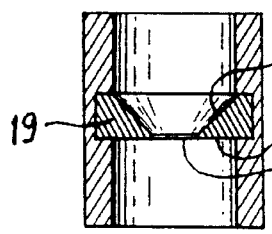
FIG. 2 shows 3 different types of internal section reductions for cylindrical risers.
Figure 2B:
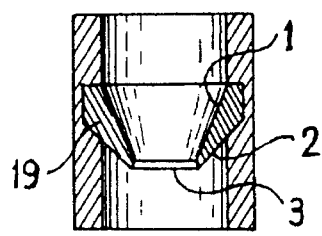
Figure 2C:
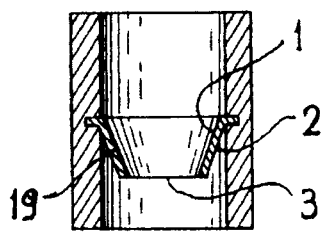
Figure 3:
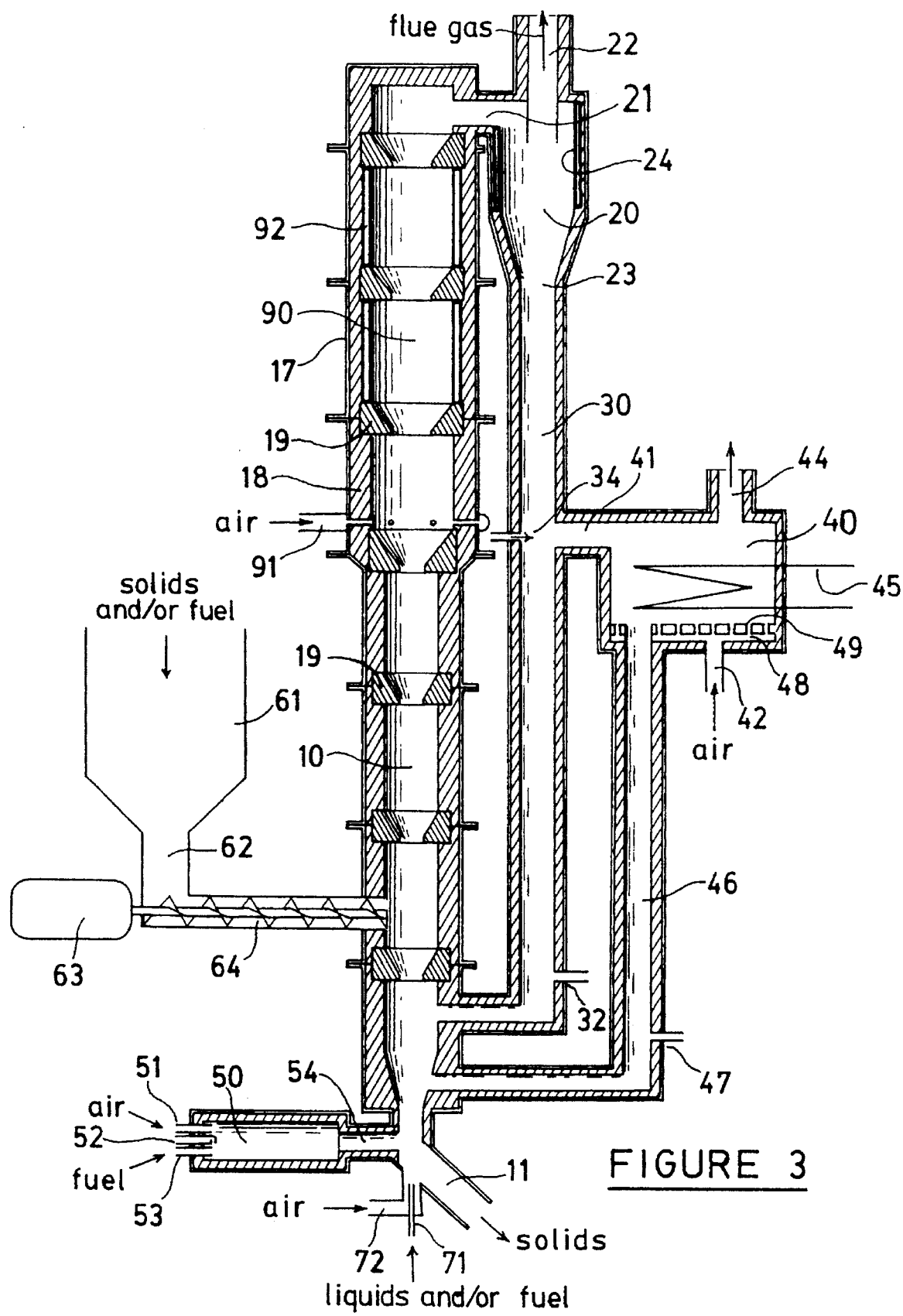
FIG. 3 shows a vertical sectional view of a preferred embodiment adapted for the staged air combustion of solids and liquids.
Figure 4:
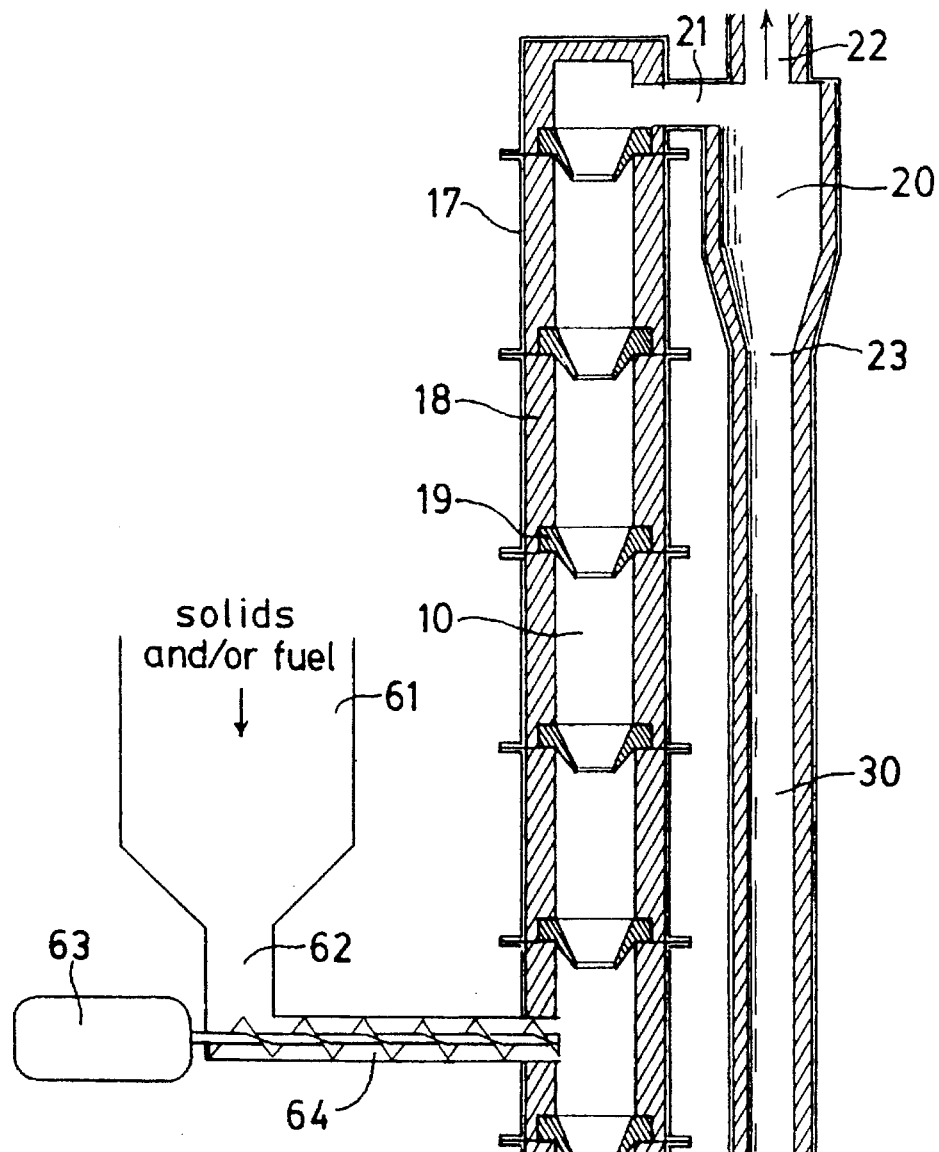
FIG. 4 shows a vertical sectional view of the preferred embodiment adapted for the gasification of solid and liquid fuels.

As discussed above, the present invention relates to a multi-staged riser with restrictions of specific design which cause fluidized solids to rise due a climbing phenomenon which occurs below transport velocities. In order to foster understanding between different types of fluidized beds and how they relate and compare to each other FIG. 1 shows the 3 main types and the riser of the preferred embodiment. FIG. 1a shows a bubbling fluidized bed and a graphic of its fluidized solids distribution inside the chamber. The bubbling fluidized bed is characterized by a dense bed at the bottom 4 containing bubbles of solids depleted gases 5 and near-zero solids density in the upper chamber or freeboard 6. FIG. 1b shows a turbulent fluidized bed and it can be seen that the bed of solids 4 is less dense than in a bubbling fluidized bed, its upper level is more diffuse and there is a certain population of solids up to a certain height inside the freeboard in a space called disengagement height 7. FIG. 1c depicts a riser of a conventional circulating fluidized bed and the graph of its bed density variation with bed height shows that the bed of solids near the bottom 4 has low density and the overall solids density throughout the riser is even lower, yet there is a definite presence of solids throughout the entire riser due to the transport of solids by the rising gases. These solids are badly distributed, being less dense along the riser axis in what is called dilute core 8 and more dense along the riser walls in what is called dense annulus 9. FIG. 1d shows a riser related to the present invention, composed of stages of different lengths and its bed density variation with bed height clearly showing the similarity of the disengagement zone at the top of each stage to the disengagement space of the turbulent bed depicted in FIG. 1b. The overall solids density along the riser 4 is however much higher and more uniform than in the conventional fluidized bed riser. Now referring to FIG. 2a through FIG. 2c we can see three typical configurations the tapered reductions of the internal horizontal cross-sectional area or restrictions of a cylindrical riser can have, all having in common an opening 3, an upper surface 1 which is conical and co-axial with the riser and making an angle between 20 and 50 degrees with riser and cone axis, the main difference among them being in the lower surface 2, FIG. 2a showing a restriction whose lower surface 2 is flat forming an angle of 90 degrees with the riser axis, FIG. 2b showing a restriction whose lower surface 2 is conical, co-axial, and with the same orientation as the upper surface but whose angle with the axis has a value in between the angle formed by the upper surface with the axis and 90 degrees. FIG. 2c shows a restriction whose lower surface 2 is parallel to the upper surface 1. If said riser horizontal internal section is square then its section restrictions may have conical surfaces or inverted pyramid frustum like surfaces with square holes in the center, not shown, whichever is easier to achieve by available construction means. FIG. 3 illustrates the reactor of a preferred embodiment adapted for staged air combustion and heat generation having a riser 10, 90 containing a bed of fluidizable solids, not shown, said riser comprising an elongated vertical vessel having a lower section 10 and an upper larger section 90, both with cylindrical shape and co-axial, said riser comprising an external shell 17 a refractory lining 18 and a plurality of internal horizontal cross-section reductions or restrictions 19 spaced throughout the riser length and whose shape can be any of the shapes shown in FIG. 2a through 2c, and said riser having an upper exit connected to a gas-solid separator 20 via conduit 21, said separator having a gas exit 22 and a solids exit 23, said solid exit being operatively connected to the bottom of the riser lower section 10 via downcomer 30 and a non-mechanical control valve 32. Said upper section 90 and gas-solid separator 20 may have part of the refractory lining replaced respectively by heat absorbing surfaces 92 and 24. The reactor may also comprise an external fluidized bed heat exchanger 40 connected to downcomer 30 via non-mechanical valve 34 and conduit 41 and to the lower riser 10 bottom via conduit 46 and flow control valve 47, said external heat exchanger being fitted with a cooling surface 45 and having a fluidizing air entrance 42 connected to a plenum 48 which feeds air to the heat exchanger fluidized bed through a bottom plate 49 said plate capable to support a bed of solids while delivering air into the bed, said external heat exchanger having a fluidization gas exit 44. The riser lower section 10 also comprises a bottom exit 11 for solids fitted with solids discharge valve, not shown. The preferred reactor also comprises a start-up heater 50 connected to the riser bottom via conduit 54, said start-up heater having an air inlet 51, a spark plug 52 and a fuel inlet 53. Said riser may have a liquid injector 71 located at the bottom said riser and/or a solids feeder comprising a hopper 61 a chute 62 a feeding screw 64 and a motor 63, said feeder connected to riser lower section 10. Said riser also having an oxidizing and fluidizing gas injection 72 located at the bottom and an oxidizing injection 91 located at the bottom of the upper larger riser section 90. During normal operation, material from solids feeder screw 64 and/or liquid injector 71 is burned reacting with air from air inlets 72 and 91 heating said bed of solids, usually sand and other inerts, which rises and is separated in the gas-solid separator, and recirculated to the bottom of the riser. Riser temperature is kept constant by extracting heat from circulating solids. Heat extraction from circulating solids is controlled in a standard way by controlling the flow of non-mechanical valves 32, 34 and 47 when external heat exchanger 40 is present, and by controling flow of non-mechanical valve 32 when there is no external heat exchanger. FIG. 4 illustrates another preferred embodiment intended for gasification of solid and/or liquid organics, having a riser 10 containing a bed of fluidizable solids, not shown, said riser comprising an external shell 17 a refractory lining 18 and a plurality of internal horizontal cross-section reductions or restrictions 19 spaced throughout the riser length, said riser also having an upper exit connected to a gas-solid separator 20 via conduit 21, said separator having a gas exit 22 and a solids exit 23 operatively connected to the bottom of the riser via downcomer 30 and control valve 32. Riser lower portion 10 also comprises a bottom exit 11 fitted with a solids discharge valve not shown, said reactor also comprising a start-up heater 50 connected to the riser bottom via conduit 54, said start-up heater having an air inlet 51, may also comprise a spark plug 52 and a fuel inlet 53. Said riser may have a liquid injector 71 located at the bottom said riser and/or a solids feeder comprising a hopper 61 a chute 62 a feeding screw 64 and a motor 63, said feeder connected to riser lower section 10. Said riser also having a fluidizing and oxidizing gas injection 72 located at the bottom. During normal operation, solid fuel from feeding screw 64 and/or liquid fuel from liquid injector 71 are gasified by reacting with sufficient air, oxygen or any other oxidizing gas from inlet 72 to generate enough heat to compensate for heat losses through the wall, and heat losses from leaving gases and keep the rising bed of solids at the ideal operating temperature. The sand leaving the riser is recycled, entering riser bottom via control valve 32. Operating temperature is controlled by controlling fuel/oxidizer ratio. Hot producer gas leaves the gas-solid separator 20 via conduit 22 to be further processed or used elsewhere.

What is claimed is:

1. A multistage turbulent circulating fluidized bed thermal reactor of the type generally comprising a riser, a gas-solids separator and a downcomer operatively interconnected, said riser comprising an elongated upright tubular internal chamber having substantially vertical walls and defining a substantially vertical axis, inside which a fluidized particulate and gas mixture is upwardly passed, said chamber having at the bottom an opening through which said gas is injected, said chamber also having substantially at the bottom means to admit recirculated and new particulate, wherein the improvement consists in the uniform distribution of said particulate throughout said chamber, the improvement being attained by:

a) dividing said chamber into a sequence of stages, said stages being defined by a plurality of spaced apart tapered annular restrictions, said restrictions defining a tapered and generally funnel-shaped top surface, and said top surface defining an angle of 20° to 60° from the vertical axis of said chamber, said restrictions each having a bottom surface defining an angle approximately 20° to 90° to the vertical surface of said chamber, said angle facing downward, said top surface of each restriction defining a widest portion substantially merging with the wall of said chamber immediately above each restriction, the vertical distance between consecutive restrictions ranging from about 1 to 5 times the cross-sectional diameter of said chamber;

b) keeping the flow of said gas within a range which defines inside each stage a superficial gas velocity substantially above minimum fluidization velocity and substantially below dilute transport velocity, said restrictions having an opening diameter such that the flow rate of said gas defines at each restriction opening a gas velocity substantially above transport velocity so as to cause said restrictions to operate like dynamic check valves on said particulate allowing particulate transport in the upward direction and hindering particulate displacement in the downward direction, so as to cause substantial accumulation of fluidized particulate inside each stage forming a string of turbulent fluidized beds along said chamber;

said solids and gas mixture moving both in co-current fashion in an upwardly direction, all of said particulate and gas mixture passing through all stages situated above injection point, said particulate being entrained by said gas, said particulate and gas mixture exiting said chamber together through an exit located substantially at the top of said chamber into said gas-solids separator, said gas being discharged from the gas-solids separator out of said reactor and said solids being returned via downcomer to the bottom of said chamber.

2. In a multistage circulating fluidized bed of the type described in claim 1, a riser wherein said tubular chamber is circular in cross-section and said restrictions are frusto-conical.

3. In a multistage circulating fluidized bed of the type described in claim 1, a riser wherein said tubular chamber is circular in cross-section and said restrictions are in the shape of a funnel.

4. In a multistage circulating fluidized bed of the type described in claim 1, a riser wherein said tubular chamber is square in cross-section and said restrictions are frusto-pyramidal.

5. In a multistage circulating fluidized bed of the type described in claim 1, a riser wherein the narrowest portion of internal surface of said restrictions opening ranges from about 0.3 to 0.7 times the cross-sectional diameter of said chamber.

6. In a circulating fluidized bed thermal reactor of the type described in claim 1, a riser wherein the narrowest portion of internal surface of said restrictions opening ranges from about 0.4 to 0.6 times the cross-sectional diameter of said chamber.

* * * * *